(12) United States Patent
Biscardi et al.

(10) Patent No.: US 6,856,753 B2
(45) Date of Patent: *Feb. 15, 2005

(54) ULTRATHIN OPTICAL PANEL AND A METHOD OF MAKING AN ULTRATHIN OPTICAL PANEL

(75) Inventors: Cyrus Biscardi, Bellport, NY (US); Calvin Brewster, North Patchoque, NY (US); Leonard DeSanto, Patchoque, NY (US); James T. Veligdan, Manorville, NY (US)

(73) Assignee: Brookhaven Science Associates, Upton, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/746,916

(22) Filed: Dec. 23, 2003

(65) Prior Publication Data

US 2004/0141712 A1 Jul. 22, 2004

Related U.S. Application Data

(63) Continuation of application No. 10/360,396, filed on Feb. 7, 2003, which is a continuation of application No. 09/845,085, filed on Apr. 27, 2001, now Pat. No. 6,519,400, which is a continuation of application No. 09/318,934, filed on May 26, 1999, now Pat. No. 6,301,417, which is a continuation-in-part of application No. 09/145,411, filed on Aug. 31, 1998, now abandoned.

(51) Int. Cl.$^7$ .......................... G02B 6/10; G03B 21/56; H04N 5/66
(52) U.S. Cl. ...................... 385/147; 385/129; 385/901; 359/443; 359/460; 348/804
(58) Field of Search ................................ 385/115, 116, 385/119, 120, 129, 901; 348/197, 804; 359/443, 460

(56) References Cited

U.S. PATENT DOCUMENTS

| | | | |
|---|---|---|---|
| 3,253,500 A | 5/1966 | Hicks, Jr. |
| 3,797,910 A | 3/1974 | Westwig |
| 3,874,783 A | 4/1975 | Cole |
| 4,090,104 A | 5/1978 | Vann et al. |
| 4,116,739 A | 9/1978 | Glenn |

(List continued on next page.)

OTHER PUBLICATIONS

Veligdan, "Unique Interactive Projection Display Screen", Sep. 29, 1997, 7 pages.

(List continued on next page.)

*Primary Examiner*—John D. Lee
*Assistant Examiner*—Omar Rojas
(74) *Attorney, Agent, or Firm*—Reed Smith LLP; William J. McNichol, Jr.; Matthew J. Esserman

(57) ABSTRACT

An ultrathin optical panel, and a method of producing an ultrathin optical panel, are disclosed, including stacking a plurality of glass sheets, which sheets may be coated with a transparent cladding substance or may be uncoated, fastening together the plurality of stacked coated glass sheets using an epoxy or ultraviolet adhesive, applying uniform pressure to the stack, curing the stack, sawing the stack to form an inlet face on a side of the stack and an outlet face on an opposed side of the stack, bonding a coupler to the inlet face of the stack, and fastening the stack, having the coupler bonded thereto, within a rectangular housing having an open front which is aligned with the outlet face, the rectangular housing having therein a light generator which is optically aligned with the coupler. The light generator is preferably placed parallel to and proximate with the inlet face, thereby allowing for a reduction in the depth of the housing.

8 Claims, 2 Drawing Sheets

U.S. PATENT DOCUMENTS

| | | | |
|---|---|---|---|
| 4,261,657 A | 4/1981 | Reiback | |
| 4,344,668 A | 8/1982 | Gunther et al. | |
| 4,418,986 A | 12/1983 | Yata et al. | |
| 4,469,402 A | 9/1984 | Yata et al. | |
| 4,586,781 A | 5/1986 | Gunther et al. | |
| 4,674,836 A | 6/1987 | Yata et al. | |
| 4,729,631 A | 3/1988 | Takahashi et al. | |
| 4,919,513 A | 4/1990 | Nakakuki et al. | |
| 5,009,483 A | 4/1991 | Rockwell, III | |
| 5,066,947 A | 11/1991 | Du Castel | |
| 5,151,956 A | 9/1992 | Bloemer | |
| 5,274,406 A | 12/1993 | Tejima et al. | |
| 5,381,502 A | 1/1995 | Veligdan | |
| 5,422,691 A | 6/1995 | Ninomiya et al. | |
| 5,455,882 A | 10/1995 | Veligdan | |
| 5,481,385 A | 1/1996 | Zimmerman et al. | |
| 5,521,725 A | 5/1996 | Beeson et al. | |
| 5,543,870 A | 8/1996 | Blanchard | |
| 5,565,839 A | 10/1996 | Poss | |
| 5,594,561 A | 1/1997 | Blanchard | |
| 5,625,736 A | 4/1997 | Veligdan | |
| 5,642,449 A | 6/1997 | Phillips | |
| 5,647,036 A | 7/1997 | Deacon et al. | |
| 5,668,907 A | 9/1997 | Veligdan | |
| 5,684,905 A | 11/1997 | Sugawara et al. | |
| 5,696,862 A | 12/1997 | Hauer et al. | |
| 5,716,118 A | 2/1998 | Sato et al. | |
| 5,764,845 A | 6/1998 | Nagatani et al. | |
| 5,821,911 A | 10/1998 | Jachimowicz | |
| 5,838,865 A | 11/1998 | Gulick | |
| 5,914,760 A | 6/1999 | Daiku | |
| 5,940,565 A | 8/1999 | Sugawara | |
| 5,985,069 A | 11/1999 | Kawabe et al. | |
| 6,002,826 A | 12/1999 | Veligdan | |
| 6,012,816 A | 1/2000 | Beiser | |
| 6,031,954 A | 2/2000 | Higuchi | |
| 6,301,417 B1 | 10/2001 | Biscardi et al. | |
| 6,317,545 B1 | 11/2001 | Veligdan | |
| 6,519,400 B2 * | 2/2003 | Biscardi et al. | 385/120 |
| 6,535,674 B2 | 3/2003 | Veligdan | |
| 6,741,779 B2 * | 5/2004 | Veligdan | 385/120 |
| 6,751,019 B2 * | 6/2004 | DeSanto et al. | 359/460 |
| 6,755,534 B2 * | 6/2004 | Veligdan et al. | 359/443 |
| 6,782,178 B2 * | 8/2004 | Veligdan | 385/129 |

OTHER PUBLICATIONS

Beiser, et al., "Ten Inch Planar Optic Display", Proceedings of the International Society for Optical Engineering (SPIE), vol. 2734, Apr. 1996, 9 pages.

Yoder, "The State-of-the-Art in Projection Display: An Introduction of the Digital Light Processing DLP", Texas Instruments Web Site, Mar. 1997, 5 pages.

DeSanto, et al., "Polyplanar Optical Display Electronics", Proceedings of the International Society (SPIE), vol. 3057, Apr. 1997, 12 pages.

* cited by examiner

ULTRATHIN OPTICAL PANEL AND A METHOD OF MAKING AN ULTRATHIN OPTICAL PANEL

CROSS REFERENCE TO RELATED APPLICATIONS

This application is a continuation of U.S. patent application Ser. No. 10/360,396, filed Feb. 7, 2003, which is a continuation of U.S. patent application Ser. No. 09/845,085, titled Apr. 27, 2001, now U.S. Pat. No. 6,519,400, which is a continuation of U.S. patent application Ser. No. 09/318,934, filed May 26, 1999, now U.S. Pat. No. 6,301,417, which is a continuation-in-part of U.S. patent application Ser. No. 09/145,411, filed Aug. 31, 1998, now abandoned.

STATEMENT REGARDING FEDERALLY SPONSORED RESEARCH OR DEVELOPMENT

This invention was made with federal government support under contract number DE-AC02-98CH10886, awarded by the U.S. Department of Energy. The government has certain rights in the invention.

BACKGROUND OF THE INVENTION

1. Field of the Invention

The present invention relates to planar optical displays, and, more particularly, to an ultrathin display panel and a method of making an ultrathin display panel.

2. Description of the Background

Optical screens typically use cathode ray tubes (CRTs) for projecting images onto the screen. The standard screen has a width to height ratio of 4:3 with 525 vertical lines of resolution. An electron beam is scanned both horizontally and vertically across the screen to form a number of pixels which collectively form the image.

Conventional cathode ray tubes have a practical limit in size, and are relatively deep to accommodate the required electron gun. Larger screens are available which typically include various forms of image projection. However, such screens have various viewing shortcomings including limited viewing angle, resolution, brightness, and contrast, and such screens are typically relatively cumbersome in weight and shape. Furthermore, it is desirable for screens of any size to appear black in order to improve viewing contrast. However, it is impossible for direct view CRTs to actually be black because they utilize phosphors to form images, and those phosphors are non-black.

Optical panels may be made by stacking waveguides defining a wedge and having a narrow inlet face along the bottom of the wedge and a vertical outlet screen disposed obliquely to the inlet face. Such a panel may be thin in its depth compared to its height and width, and the cladding of the waveguides may be made black to increase the black surface area, but such a panel may require expensive and cumbersome projection equipment to distribute the image light across the narrow inlet face, which equipment thereby increases the total size of the panel.

Therefore, the need exists for an optical panel which possesses the advantages corresponding to a stacked waveguide panel, but which does not require the use of expensive and cumbersome projection equipment, nor suffer from the increase in size necessitated by such equipment.

SUMMARY OF THE INVENTION

The present invention is directed to an ultrathin optical panel. The panel includes a plurality of stacked optical waveguides, wherein the plurality forms an outlet face and an inlet face, and at least one coupler connected to the inlet face which redirects light along a non-perpendicular axis to the inlet face to a perpendicular axis to the inlet face. The coupler allows the panel to be created using simple light generating equipment, and allows that equipment to be mounted in close proximity with the inlet face.

The present invention is also directed to a method of producing an ultrathin optical panel. The method includes vertically stacking a plurality of glass sheets, which sheets may be coated with a transparent cladding substance or may be uncoated, fastening together the plurality of stacked coated glass sheets using an epoxy or ultraviolet adhesive, applying uniform pressure to the stack, curing the stack, sawing the stack to form an inlet face on a side of the stack and an outlet face on an opposed side of the stack, bonding a coupler to the inlet face of the stack, and fastening the stack, having the coupler bonded thereto, within a rectangular housing having an open front which is aligned with the outlet face, the rectangular housing having therein a light generator which is optically aligned with the coupler.

The present invention solves problems experienced in the prior art, such as the required use of expensive and cumbersome projection equipment, by providing a light inlet which, though smaller in surface area than the outlet face, is large enough and symmetrical enough to not necessitate the use of expensive projection equipment. The present invention also retains the advantages which correspond to a stacked waveguide panel, such as improved contrast and minimized depth.

Those and other advantages and benefits of the present invention will become apparent from the detailed description of the invention hereinbelow.

BRIEF DESCRIPTION OF THE SEVERAL VIEWS OF THE DRAWINGS

For the present invention to be clearly understood and readily practiced, the present invention will be described in conjunction with the following figures, wherein.

DETAILED DESCRIPTION OF THE INVENTION

It is to be understood that the figures and descriptions of the present invention have been simplified to illustrate elements that are relevant for a clear understanding of the present invention, while eliminating, for purposes of clarity, many other elements found in a typical optical display panel. Those of ordinary skill in the art will recognize that other elements are desirable and/or required in order to implement the present invention. However, because such elements are well known in the art, and because they do not facilitate a better understanding of the present invention, a discussion of such elements is not provided herein.

Figure 1:
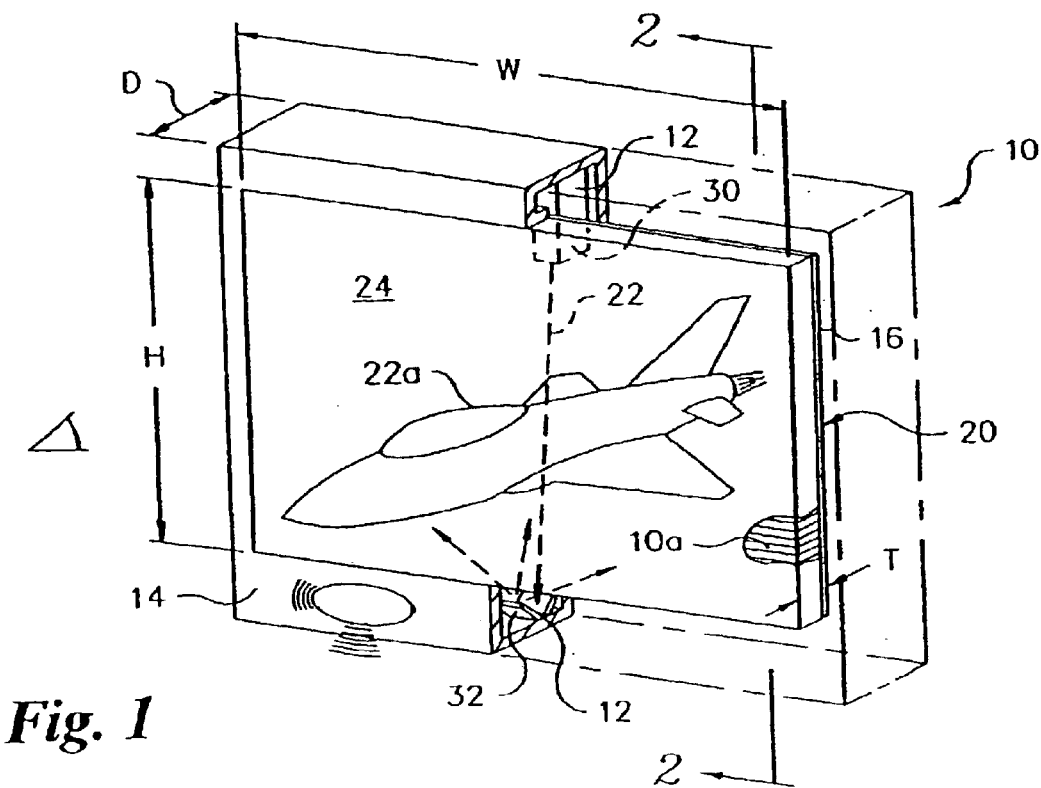
FIG. 1 is an isometric view schematic illustrating an optical panel.

FIG. 1 is an isometric view schematic illustrating an optical panel 10. The optical panel 10 includes a plurality of waveguides 10a, wherein one end of each waveguide 10a forms an inlet for that waveguide, and wherein the opposite end of each waveguide 10a forms an outlet for that waveguide 10a, a light generation system 12, a housing 14 in which the light generation system 12 and the plurality of waveguides 10a are mounted, and a coupler 16.

Each waveguide 10a extends horizontally, and the plurality of stacked waveguides 10a extends vertically. The plurality of inlet ends define an inlet face 20 for receiving image light 22. The plurality of outlet ends define an outlet face 24 disposed substantially parallel with the inlet face 20 for displaying light 22. The light 22 may be displayed in a form such as, but not limited to, a video image 22a.

The housing 14 is sized larger in height and width than the combination of the light generation system 12 and the plurality of waveguides 10a, to allow the placement of the plurality 10a and light generation system 12 therein. The housing 14 has an open front to allow for viewing of the outlet face 24, and has a closed depth D looking from the open front to the back of the housing 14.

The light generation system 12 provides the light viewed through the waveguides 10. The light generation system 12 includes a light source 30, and a light redirection element 32 that redirects incident light 22 from the light source 30 into the coupler 16, which light redirection element 32, in combination with the coupler 16, allows for a reduction in the depth D of the housing 14. This reduction allowance occurs where the light redirection element 32 is configured for turning the light 22 from a source 30, which source 30 is placed within the housing 14 proximate to and parallel with the vertical stack of the plurality of waveguides 10a, into the coupler 16, which then acutely turns the light 22 into the waveguides 10a. The coupler 16 is preferably effective for turning the image light in an exemplary range of about 45° up to about 90°, in order to generate approximately horizontal transmission through the plurality of wave guides 10a. The light generation system 12 may also include a modulator and further imaging optics. The light generation system 12 is discussed with more particularity with respect to FIG. 2.

The parallel surfaces of the inlet face 20 and the outlet face 24 allow the panel 10 and enclosing housing 14 to be made ultrathin in depth. The panel 10 has a nominal thickness T which is the depth of the waveguides 10a between the inlet face 20 and the outlet face 24, and thickness T is substantially less than the height H and width W of the outlet face 24. The panel 10 may be configured in typical television width to height ratios of 4:3 or 16:9, for example. For a height H of about 100 cm and a width W of about 133 cm, the panel thickness T of the present invention may be about 1 cm. The depth D may vary accordingly with the thickness T, but, in the embodiment described hereinabove, the depth D of the housing 14 is preferably no greater than about 12 cm.

Figure 2:
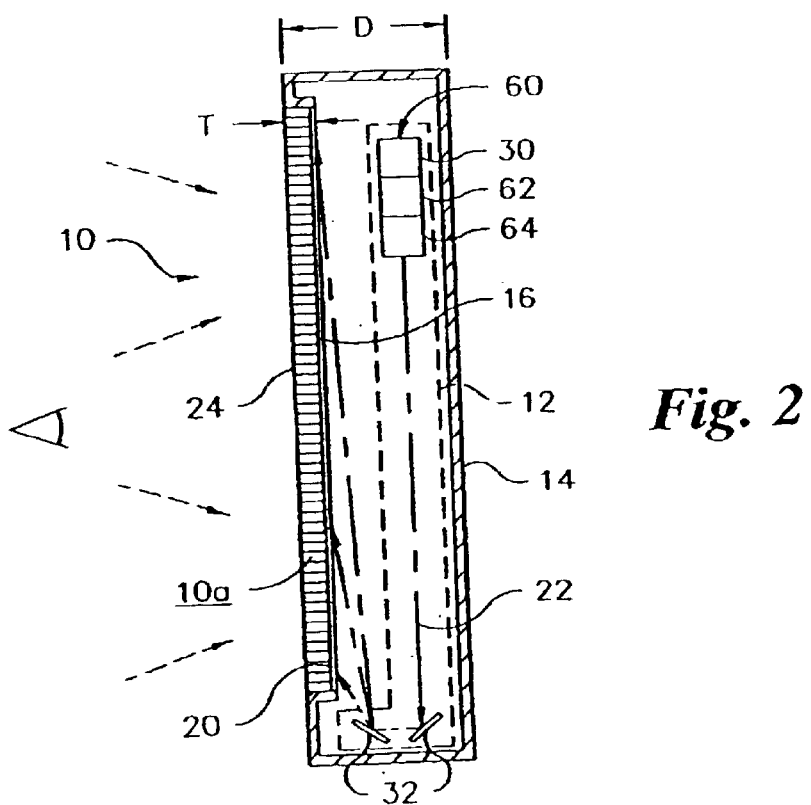
FIG. 2 is a side view cross sectional schematic of an ultrathin optical panel.

FIG. 2 is a side view cross sectional schematic of an ultrathin optical panel 10. The panel 10 includes a plurality of stacked waveguides 10a, a light generation system 12, a coupler 16, and a housing 14.

The light generation system 12, in one embodiment of the present invention, includes a projector 60 which is optically aligned with a light redirection element 32. An image is projected onto the light redirection element 32, and is then redirected to the coupler 16 for transmission through the waveguides 10a for display on the outlet face 24. In a preferred embodiment, the projector 60 is disposed adjacent to the top of the inlet face 20 for projecting the image light 22 generally parallel thereto, and is spaced therefrom a distance sufficient to allow for a turning of the image light 22 from the light redirection element 32 into the coupler 16 for transmission through the waveguides 10a.

The projector 60 may include a suitable light source 30 for producing the light 22. The light source 30 may be a light bulb, slide projector, video projector, or laser, for example. The projector 60 may also include a modulator 62 for modulating the light 22 to form an image 22a. The modulator 62 may be, for example, a conventional Liquid Crystal Display (LCD), a Digital Micromirror Device (DMD), a GLV, a laser raster scanner, a PDLC, an LCOS, a MEMS, or a CRT. The projector 60 may also include suitable image optics 64 for distributing or broadcasting the image light 22 horizontally and vertically across the light redirection element 32 for properly focused transmission to the coupler 16. The image optics 64 may include focusing and expanding lenses and mirrors. One or more light generation systems 12, such as between 2 and 4 such systems, may be used to provide light to one or more portions of the coupler 16. Expansion lenses may be used for both the imaging optics 64 and the light redirection element 32 to expand the image light 22 both vertically and horizontally over the coupler 16. Alternatively, suitable rastering systems may be used as the light generation system 12 to form the image by rastering the image light 22 both horizontally and vertically across the coupler 16.

In the illustrated embodiment, the light 22 is initially projected from the projector 60 vertically downward inside the housing 14 to the bottom thereof where the light redirection elements 32 are mounted, and the light redirection elements 32 then redirect the image light 22 vertically upwardly at a small acute angle for broadcast over the entire exposed surface of the coupler 16. In an alternative embodiment, the projector 60 could be placed beneath the inlet face 20 rather than behind the inlet face 20.

The allowable incidence angle of the image light 22 on the coupler 16 is determined by the capability of the coupler 16 to turn the light 22 into the inlet face 20 of the panel 10. The greater the turning capability of the coupler 16, the closer the projector 60 may be mounted to the coupler 60 for reducing the required depth D of the housing 14.

Figure 3:
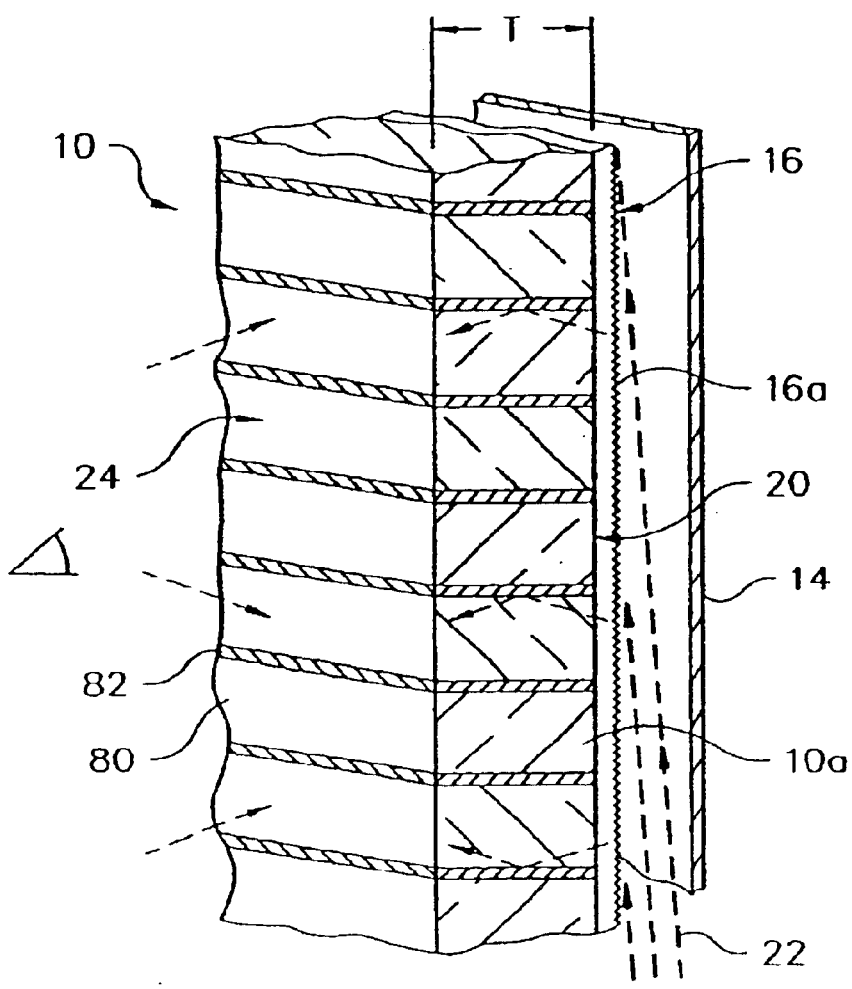
FIG. 3 is a schematic illustrating a horizontal and vertical cross section of an ultrathin display panel using a prismatic coupler

FIG. 3 is a schematic illustrating a horizontal and vertical cross section of an ultrathin optical panel 10. The panel 10 includes a plurality of vertically stacked optical waveguides 10a, a light generation system 12 (see FIG. 2), a coupler 16, and a housing 14.

Each waveguide 10a of the plurality of waveguides 10a includes a central transparent core 80 having a first index of refraction. The core 80 may be formed of any material known in the art to be suitable for passing electromagnetic waves therethrough, such as, but not limited to plexiglass or polymers. The central core 80 may be formed of an optical plastic, such as Lexan®, commercially available from the General Electric Company®, or glass, such as type BK7. The preferred embodiment of the present invention is implemented using individual glass sheets, which are typically in the range between 2 and 40 microns thick, and which may be of a manageable length and width. The central core 80 is laminated between at least two cladding layers 82. The cladding layers 82 immediately in contact with the glass have a second index of refraction lower than that of the cores 80, thus allowing for substantially total internal reflection of the light 22 as it is transmitted through the cores 80. The cladding 82 may be a suitable plastic, glass, plastic, polyurethane, low refractive index polymer, or epoxy, for example, and is preferably black in color. Where multiple cladding layers 82 are used, it is preferable that a clear cladding layer contact the glass, and a black cladding layer be disposed between adjacent clear cladding layers, thus improving both viewing contrast of the outlet face 24 and internal reflection of the light 22 through the core 80. The use of at least one black cladding layer 82 provides improved contrast by providing additional blackness at the outlet face 24. Further, the exposed edges of the black cladding 82 at the outlet face 24 are directly viewable to the observer. Additionally, ambient light which enters the waveguides off-axis through the outlet face 24 will be absorbed internally by the black cladding 82. The black cladding 82 may be formed in any suitable manner such as with black spray paint, or carbon particles within an epoxy adhesive joining together the adjacent cores 80 in one or more black cladding layers 82. The manner of forming the cladding layers 82 and cores 80 is discussed with more specificity hereinbelow.

The waveguides 10a of the preferred embodiment are in the form of flat ribbons extending continuously in the horizontal direction along the width of the outlet face 24. The ribbon waveguides 10a are preferably stacked vertically along the height of the outlet face 24. The vertical resolution of the panel 10 is thus dependent on the number of waveguides 10a stacked along the height of the outlet face 24. For example, a stacking of 525 waveguides would provide 525 vertical lines of resolution.

The plurality of stacked waveguides 10a may be formed by first laying a first glass sheet in a trough sized slightly larger than the first glass sheet. The trough may then be filled with a thermally curing epoxy. The epoxy is preferably black, in order to form a black layer between waveguides, thereby providing improved viewing contrast. Furthermore, the epoxy should possess the properties of a suitable cladding layer 82, such as having a lower index of refraction than the glass sheets to allow substantially total internal reflection of the light 22 within the glass sheet. After filling of the trough, glass sheets 80 are repeatedly stacked, and a layer of epoxy forms between each glass sheet 80. The stacking is preferably repeated until between approximately 500 and 800 sheets have been stacked. Uniform pressure may then be applied to the stack, thereby causing the epoxy to flow to a generally uniform level between glass sheets 80. In a preferred embodiment of the present invention, the uniform level obtained is approximately 0.0002" between glass sheets 80. The stack may then be baked to cure at 80 degrees Celsius for such time as is necessary to cure the epoxy, and the stack is then allowed to cool slowly in order to prevent cracking of the glass. After curing, the stack may be placed against a saw, such as, but not limited to, a diamond saw, and cut to a desired size. The cut portions of the panel 10 may then be polished with a diamond polisher to remove any saw marks.

In an alternative embodiment of the present invention, a plurality of glass sheets 80 are individually coated with, or dipped within, a substance having an index of refraction lower than that of the glass, and the plurality of coated sheets are fastened together using glue or thermally curing epoxy, which is preferably black in color. A first coated glass sheet 10a is placed in a trough sized slightly larger than the first coated glass sheet 10a, the trough is filled with a thermally curing black epoxy, and the coated glass sheets 10a are repeatedly stacked, forming a layer of epoxy between each coated glass sheet 10a. The stacking is preferably repeated until between approximately 500 and 800 sheets have been stacked. Uniform pressure may then be applied to the stack, followed by a cure of the epoxy, and a sawing of the stack into a desired size. The stack may be sawed curved or flat, and may be frosted or polished after sawing.

In another alternative embodiment of the present invention, the glass sheets 80 preferably have a width in the range between 0.5" and 1.0", and are of a manageable length, such as between 12" and 36". The sheets 80 are stacked, with a layer of black ultraviolet adhesive being placed between each sheet 80. Ultraviolet radiation is then used to cure each adhesive layer, and the stack may then be cut and/or polished.

After sawing and/or polishing the stack, each of the above embodiments of the method also includes bonding a coupler 16 to the inlet face 20 of the stack, and fastening the stack, having the coupler 16 bonded thereto, within the rectangular housing 14. The stack is fastened such that the open front of the housing 14 is aligned with the outlet face 24, and the light generator 12 within the housing 14 is optically aligned with the coupler 16.

The light generation system 12 provides light 22 which is incident on the coupler 16, and is substantially as discussed with respect to FIG. 2. The source 30 of the light generation system 12 may be mounted within the housing 14 in a suitable location to minimize the volume and depth of the housing 14. The source 30 is preferably mounted within the housing 14 directly behind the inlet face 20 at the top thereof to initially project light 22 vertically downwardly, which light is 22 then turned by elements 32 of the light generation system 12 vertically upwardly to optically engage the coupler 16. In the preferred embodiment of the present invention, the individual waveguides 10a extend horizontally without inclination, thus allowing the image to be transmitted directly horizontally through the waveguides 10a for direct viewing by an observer, thereby allowing the viewer to receive full intensity of the light 22 for maximum brightness. Thus, for maximum brightness, the light 22 incident from the light generation system 12 must be turned substantially horizontally. A prismatic coupler 16 may be used to turn the light at an angle up to 90 degrees for entry into the inlet face 20. In one embodiment of the present invention, a TRAF turns the light at an angle of 81 degrees.

The light coupler 16 adjoins the entire inlet face 20 and may be suitably bonded thereto for coupling or redirecting the light 22 incident from the light generation system 12 into the inlet face 20 for transmission through the waveguides 10a. The waveguides 10a of the present invention may have a limited acceptance angle for receiving incident light 22, and the coupler 16 is aligned to ensure that the image light 22 is suitably turned to enter the waveguide cores 80 within the allowable acceptance angle.

In a preferred embodiment of the present invention discussed hereinabove, the coupler 16 includes fresnel prismatic grooves 16a that are straight along the width of the inlet face 20 and are spaced vertically apart along the height of the inlet face 20, which prismatic coupler 16 is capable of turning light up to an angle of 90 degrees. In a preferred embodiment of the present invention, the prismatic coupler 16 is a Transmissive Right Angle Film (TRAF) commercially available from the 3M Company® of St. Paul, Minneapolis, under the tradename TRAF II®. An optional reflector may be disposed closely adjacent to the prismatic coupler 16 for reflecting back into the waveguides 10a any stray light 22 at the grooves 16a.

The coupler 16 may also take the form of a diffractive element 16. The diffractive coupler 16 includes a diffractive grating having a large number of small grooves extending horizontally and parallel with the individual waveguides 10a, which grooves are closely spaced together in the vertical direction over the height of the inlet face 20. The coupler 16 may take other forms as well, including, but not limited to, holographic elements.

The housing 14 supports the waveguide stack 10a and the light generation system 12 in a substantially closed enclosure. The outlet face 24 faces outwardly and is exposed to the viewer and ambient light, and the inlet face 20 and adjoining coupler 16 face inwardly toward the preferably black surfaces within the housing 14, thereby providing additional black for contrast at the outlet face 24. This additional black is provided at the outlet face 24 due to the passive nature of the waveguides 10a and the coupler 16. When these passive devices are enclosed in a black area, the outlet face 24 will appear black when not illuminated by image light 22 incident on the inlet face 20.

Those of ordinary skill in the art will recognize that many modifications and variations of the present invention may be implemented. The foregoing description and the following claims are intended to cover all such modifications and variations.

What is claimed is:

1. An optical panel for displaying a projected light image, comprising:
    a plurality of stacked planar optical waveguides, each having a first end and a second end, wherein an outlet face is defined by the plurality of first ends, wherein an inlet face is defined by the plurality of second ends, the inlet face being substantially parallel to the outlet face, and wherein the inlet face and the outlet face are curved; and
    at least one coupler connected to the inlet face which redirects light that forms the projected light image along a non-perpendicular axis to the inlet face to a perpendicular axis to the inlet face.

2. An optical panel for displaying a projected image, comprising:
    a plurality of stacked planar optical waveguides, each having a first end and a second end, wherein an outlet face is defined by the plurality of first ends, wherein an inlet face is defined by the plurality of second ends, the inlet face being substantially parallel to the outlet face, and wherein the inlet face and the outlet face are curved; and
    at least one coupler connected to the inlet face which redirects light along a non-perpendicular axis to the inlet face to a perpendicular axis to the inlet face;
    wherein the light forms an image which is projected through the optical panel and is formed at the outlet face.

3. An optical panel for displaying a projected light image, comprising:
    a plurality of stacked planar optical waveguides, each having a first end and a second end, wherein an outlet face is defined by the plurality of first ends, wherein an inlet face is defined by the plurality of second ends, the inlet face being substantially parallel to the outlet face, wherein the inlet face and the outlet face are curved, wherein a light image is projected onto the inlet face, and wherein at least one waveguide extends in one direction completely across the outlet face.

4. An optical panel for displaying a projected image, comprising:
    a plurality of stacked planar optical waveguides, each having a first end and a second end, wherein an outlet face is defined by the plurality of first ends, wherein an inlet face is defined by the plurality of second ends, the inlet face being substantially parallel to the outlet face, wherein the inlet face and the outlet face are curved, wherein light not incident to the inlet face is redirected incident to the inlet face, wherein the light incident to the inlet face forms an image which is projected through the optical panel and is formed at the outlet face, and wherein at least one waveguide extends in one direction completely across the outlet face.

5. An optical panel for displaying a projected light image, comprising:
    a plurality of stacked planar optical waveguides, each having a first end and a second end, wherein an outlet face is defined by the plurality of first ends, and wherein an inlet face is defined by the plurality of second ends, the inlet face being substantially parallel to the outlet face, and wherein the inlet face and the outlet face are curved; and
    at least one coupler connected to the inlet face which redirects light that forms the projected light image into the inlet face;
    wherein at least one waveguide extends in one direction completely across the outlet face.

6. An optical panel for displaying a projected image, comprising:
    a plurality of stacked planar optical waveguides, each having a first end and a second end, wherein an outlet face is defined by the plurality of first ends, and wherein an inlet face is defined by the plurality of second ends, the inlet face being substantially parallel to the outlet face, and wherein the inlet face and the outlet face are curved; and
    at least one coupler connected to the inlet face which redirects light into the inlet face;
    wherein the light forms an image which is projected through the optical panel and is formed at the outlet face;
    wherein at least one waveguide extends in one direction completely across the outlet face.

7. An optical panel for displaying a projected light image, comprising:
    a plurality of stacked planar optical waveguides, each having a first end and a second end, wherein an outlet face is defined by the plurality of first ends, and wherein an inlet face is defined by the plurality of second ends, the inlet face being substantially parallel to the outlet face, and wherein the inlet face and the outlet face are curved; and
    at least one coupler provided at the inlet face which redirects light that forms the projected light image into the inlet face.

8. An optical panel for displaying a projected image, comprising:
    a plurality of stacked planar optical waveguides, each having a first end and a second end, wherein an outlet face is defined by the plurality of first ends, and wherein an inlet face is defined by the plurality of second ends, the inlet face being substantially parallel to the outlet face, and wherein the inlet face and the outlet face are curved; and
    at least one coupler provided at the inlet face which redirects light into the inlet face;
    wherein the light forms an image which is projected through the optical panel and is formed at the outlet face.

* * * * *